United States Patent [19]
Bottos

[11] 3,824,734
[45] July 23, 1974

[54] INSECT TRAP

[76] Inventor: Baltassar Bottos, 361 Marlton Ave., Camden, N.J. 08105

[22] Filed: June 6, 1973

[21] Appl. No.: 367,634

[52] U.S. Cl. .................................. 43/121, 43/118
[51] Int. Cl. ............................................ A01m 1/10
[58] Field of Search ............................ 43/121, 118

[56] References Cited
UNITED STATES PATENTS

| | | | |
|---|---|---|---|
| 321,437 | 7/1885 | Horton | 43/118 |
| 333,676 | 1/1886 | Sanford | 43/118 |
| 721,913 | 3/1903 | Palmer | 43/118 X |
| 2,741,066 | 4/1956 | Conway | 43/121 |

FOREIGN PATENTS OR APPLICATIONS

| 11,420 | 1894 | Great Britain | 43/118 |
|---|---|---|---|

Primary Examiner—Louis G. Mancene
Assistant Examiner—Daniel J. Leach

[57] ABSTRACT

A collapsible construction for an insect trap adapted to be suspended over a pet feeding bowl, the trap being downwardly concave and comprising a downwardly divergent circumferential outer wall and an inner wall extending upwardly and inwardly about the lower region of the outer wall, both walls combining to enclose a space therebetween. The inner wall terminates at a central opening in which bait support means is mounted for enticing insects upwardly through the opening into the enclosed space.

4 Claims, 9 Drawing Figures

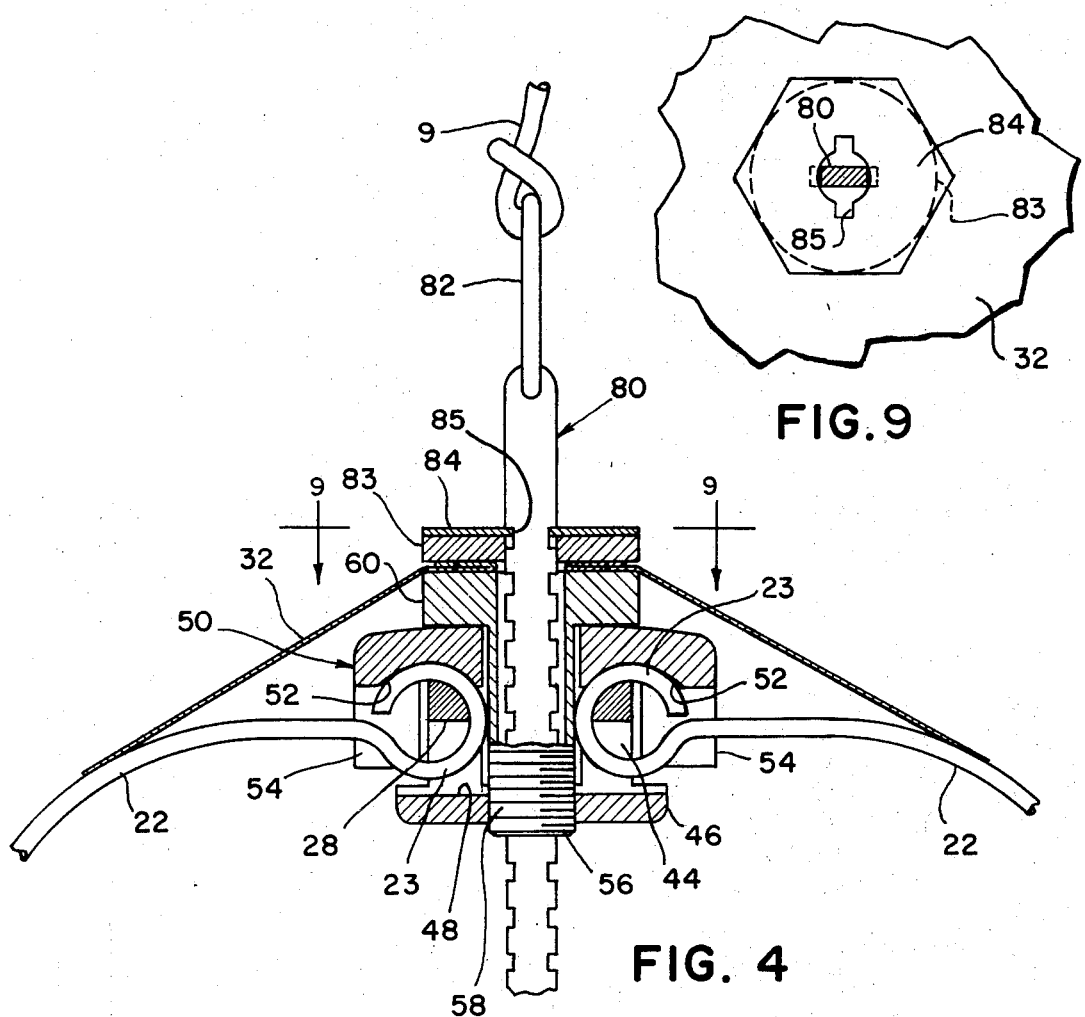

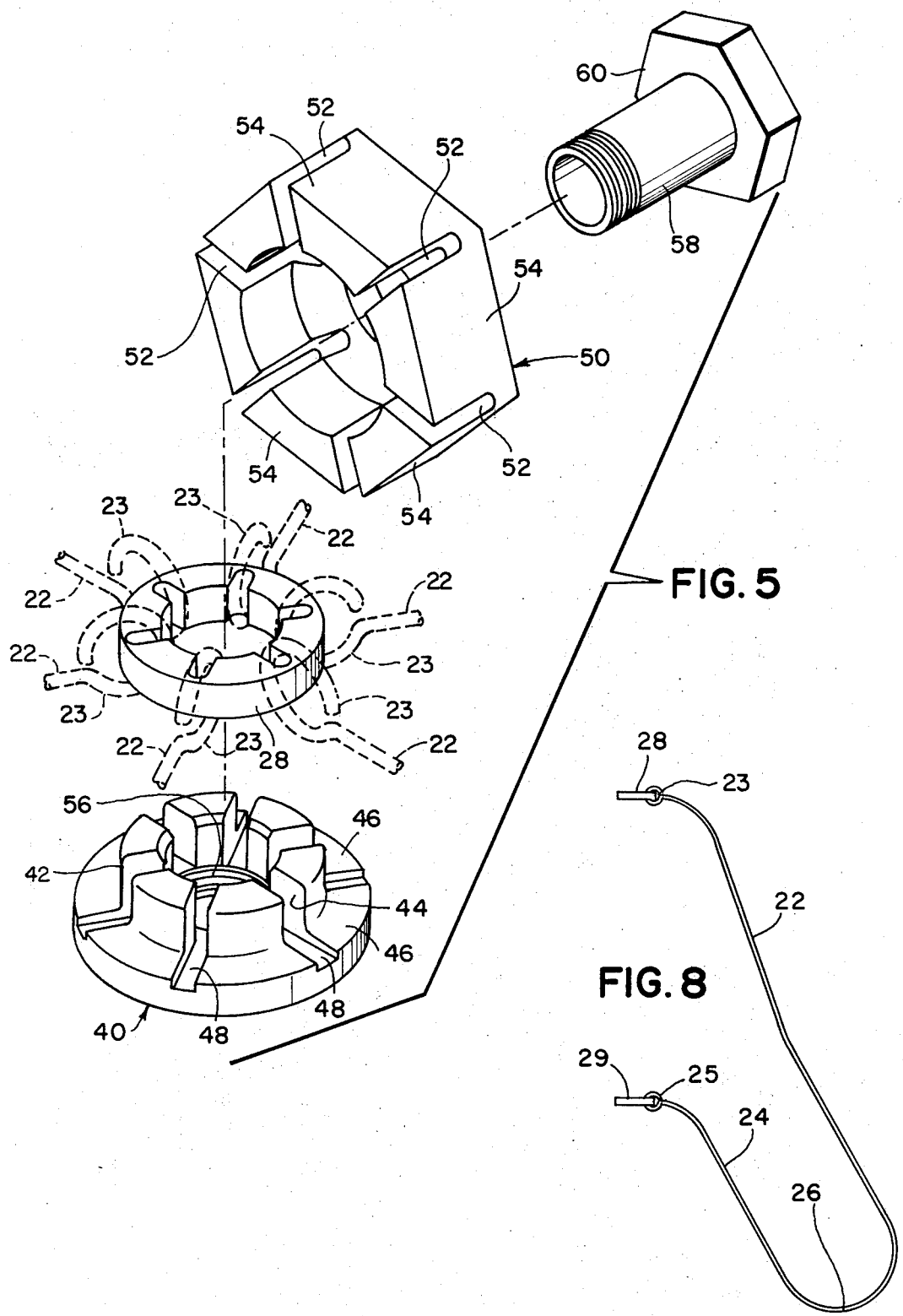

INSECT TRAP

BACKGROUND OF THE INVENTION

Although the device of the present invention has been primarily developed and employed for use as an insect trap, and will be illustrated and described hereinafter with particular reference thereto, it is appreciated that the device of the instant invention may, with equal suitability, be employed as a lampshade, bird cage, or otherwise, as desired, all of which applications are intended to be comprehended herein.

While the problem of flies and similar insects gathering about an animal or pet feeding bowl is well known, and there have been prior trap constructions proposed, these devices have not been entirely satisfactory, providing objectionable construction to the animal attempting to eat, being complex and expensive in construction, and often failing to perform the essential trapping function.

SUMMARY OF THE INVENTION

Accordingly, it is an important object of the present invention to provide an insect trap for protecting an animal or pet feeding bowl which is extremely simple in structure for economy in manufacture and ultimate costs, lightness in weight for ease of access to food by the animal, and which is highly effective in the trapping of insects to insure their permanent removal from the animal and food.

It is another object of the present invention to provide an insect trap having the advantageous characteristics mentioned in the preceding paragraph, which is adapted to be quickly and easily collapsed and erected, as for convenience in storage and shipment, during intervals between use.

It is a more particular object of the present invention to provide a protective insect trap which is adapted to be fabricated of flexible sheeting, such as fabric, for lightness in weight and easy collapsibility, while providing a staunch and rigid framework supporting the sheeting in distended condition to afford reliability and durability throughout a long useful life.

Other objects of the present invention will become apparent upon reading the following specification and referring to the accompanying drawings, which form a material part of this disclosure.

The invention accordingly consists in the features of constructions, combinations of elements, and arrangements of parts, which will be exemplified in the construction hereinafter described, and of which the scope will be indicated by the appended claims.

BRIEF DESCRIPTION OF THE DRAWINGS

FIG. 4 is a partial sectional elevational view, generally similar to FIG. 3, but showing an upper hub assembly of the present invention.

FIG. 5 is a partial horizontal sectional view taken generally along the line 5—5 of FIG. 4.

FIG. 6 is a bottom view of the insect trap assembly of FIG. 1.

FIG. 8 is an elevational view showing a single frame of the structure of FIG. 7.

FIG. 9 is a partial generally horizontal sectional view taken along the line 9—9 of FIG. 4.

DESCRIPTION OF THE PREFERRED EMBODIMENT

Figure 1:
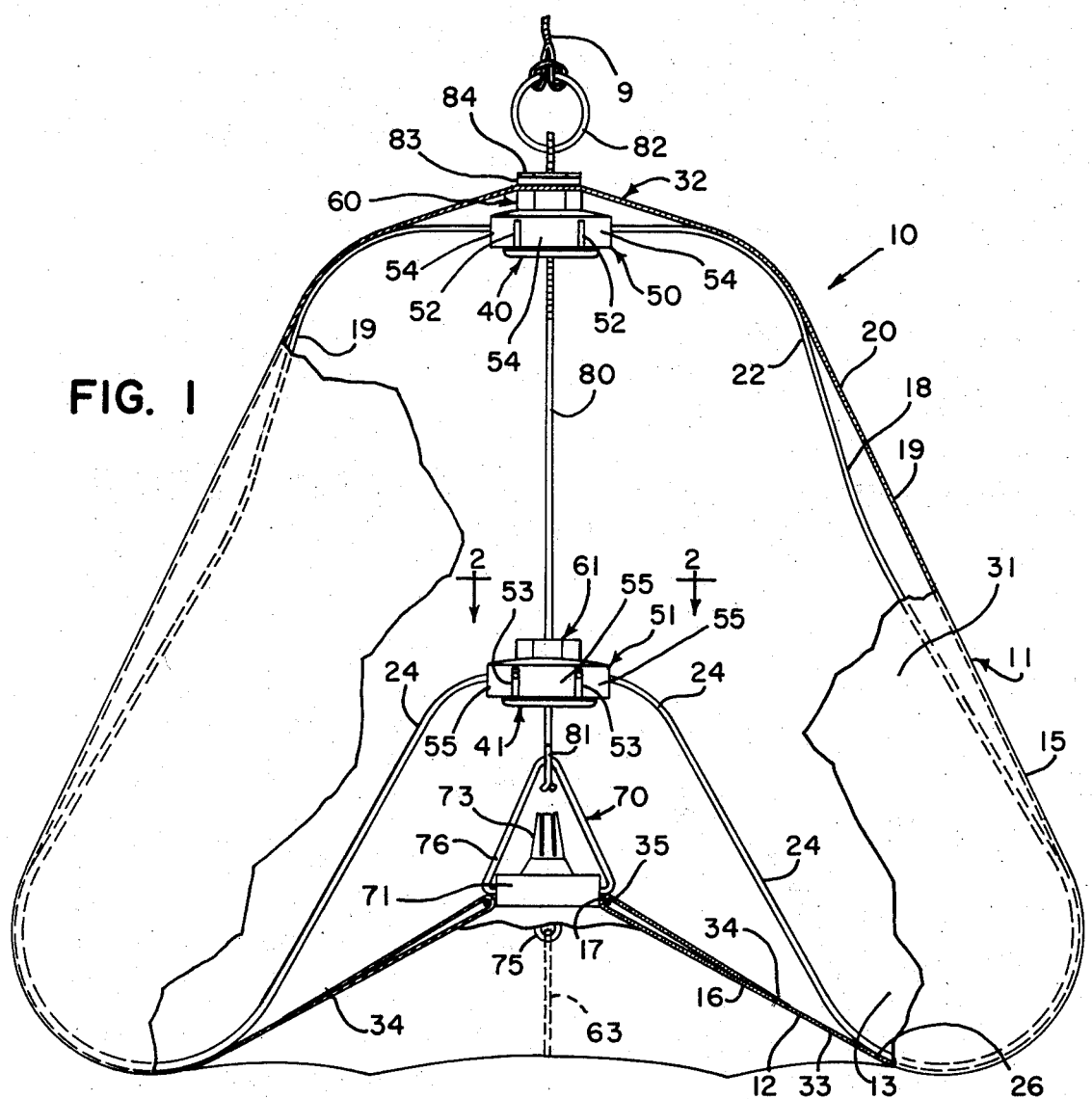
FIG. 1 is an elevational view showing an insect trap of the present invention suspended in operative condition and partly broken away to illustrate interior construction.

Referring now more particularly to the drawings, and specifically to FIG. 1 thereof, an insect trap is there generally designated 10, and shown as freely suspended from an overhead support or against a wall, as by a suitable flexible elongate suspension element 9.

More particularly, the trap 10 includes an inverted cup-shaped or downwardly concave body 11. That is, the cup of bell-shaped body 11 diverges downwardly so as to have a downwardly facing inner region 12. The circumferential, bell-shaped body 11 has its wall interiorly hollow, as at 13.

Viewed otherwise, the body 11 may be seen to include a circumferentially extending, downwardly divergent, generally conical outer wall 15, and an inner wall 16 extending about the lower region of the outer wall and upwardly and inwardly therefrom to terminate in a central opening 17. The outer wall 15 and inner wall 16 are spaced to define therebetween the interior, generally bell-shaped space 13.

Figure 7:
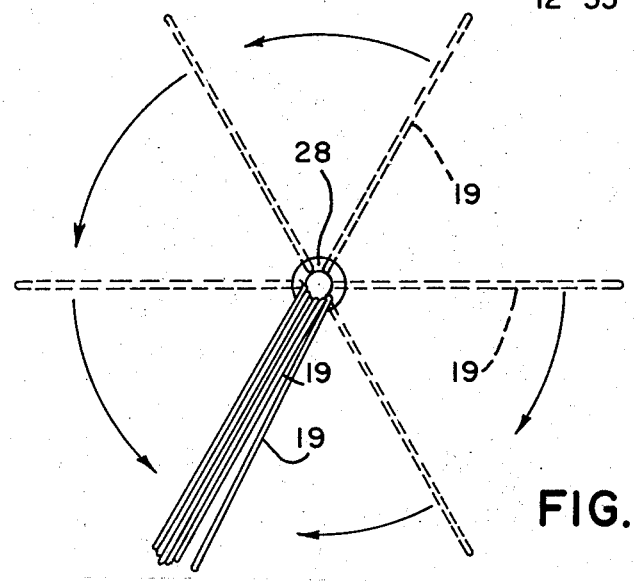
FIG. 7 is a diagrammatic top plan view illustrating the mode of collapse of the instant device.
Figure 2:
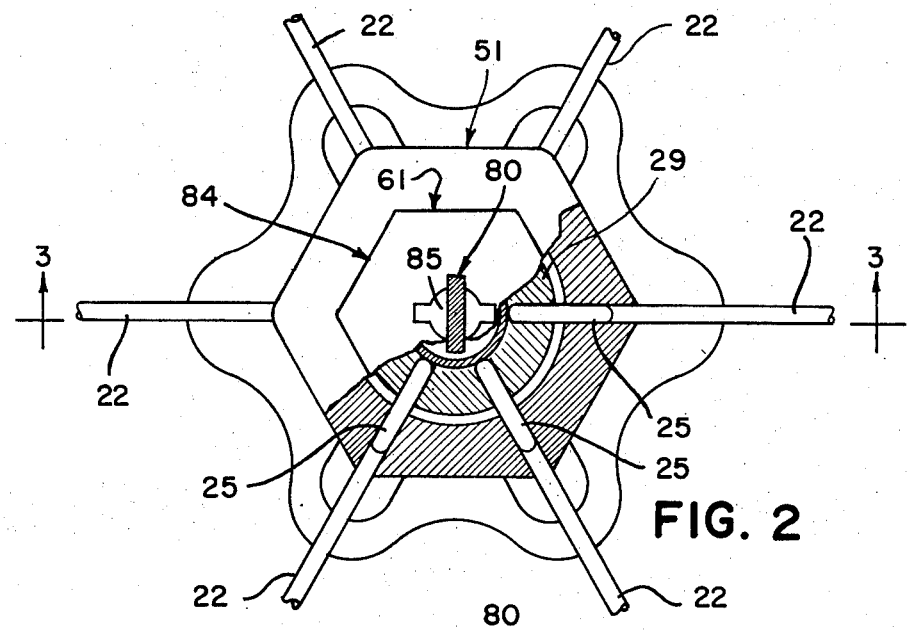
FIG. 2 is a partial horizontal sectional view taken generally along the line 2—2 of FIG. 1 showing a lower hub assembly of the present invention, partly broken away for clarity.
Figure 3:
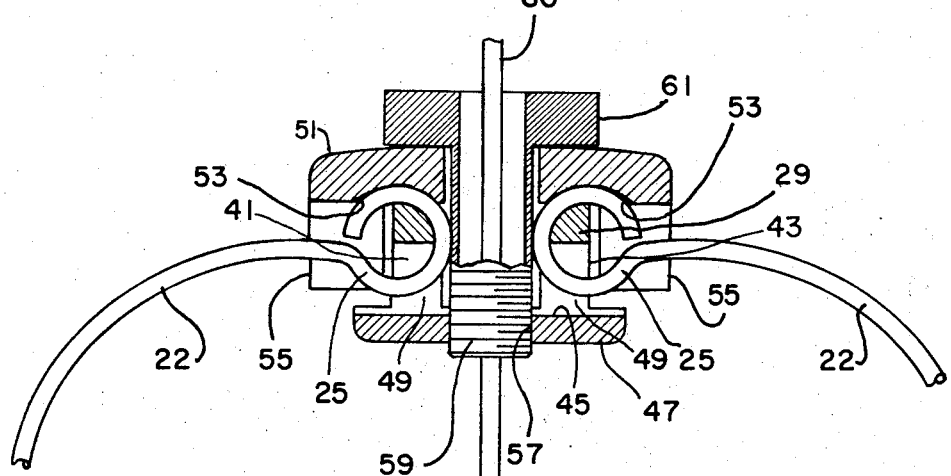
FIG. 3 is a partial sectional elevational view taken generally along the line 3—3 of FIG. 2, showing a lower hub assembly of the present invention.

More specifically, the outer and inner walls 15 and 16 are defined by an open framework 18 composed of a plurality of spaced frame pieces 19 and covered by flexible sheeting 20, say fabric or other suitable flexible sheeting, distended over the framework. The frame pieces 19 may all be substantially identical and formed of an elongate member bent to an open loop or other suitable configuration. In practice, the frame pieces 19, as best seen in FIG. 8, may each be fabricated of suitable wire or rod stock, say including an obliquely upwardly and inwardly extending outer leg 22 terminating at its upper end in an eye or loop 23, and an obliquely upwardly and inwardly extending inner leg 24 terminating at its upper end in an eye or loop 25. The outer leg eye 23 may be located above and generally over the inner leg eye 25. Integrally connecting the outer and inner legs 22 and 24 may be an arcuate lowermost intermediate region 26. A plurality of the frame pieces 19 are utilized, being six in number in the illustrated embodiment, and a generally annular or centrally open fitting 28 of polygonal, circular or similar configuration extends through all of the upper eyes 23 of the several frame pieces, while a similar, annular or centrally open fitting 29 of polygonal, circular or similar configuration extends through all the lower eyes 25 of the several frame pieces. In this manner, the plurality of frame pieces are connected together for movement between their radially outwardly projecting, erected or set up condition of FIG. 1–6, and the collapsed condition in congruent face-to-face engaging relation shown in FIG. 7. FIG. 7 also shows, but in phantom, the erected or set-up, radial disposition of the frame pieces 19, being equiangularly spaced with respect to each other, and each having its upper and lower eyes 23 and 25 located at a respective corner or junction of the polygonal fittings 28 and 29.

The flexible outer sheet covering 20 includes an outer sheeting 31 of downwardly divergent circumferential configuration extending about and distended over the outer frame piece legs 22. The outer sheeting 31 extends upwardly and inwardly, spacedly over the upper frame piece eyes 23, as at 32, therebeing suitably finished as by a wide annular hem, or the like.

The inner wall 16 includes an inner flexible sheeting 33, also of downwardly divergent circumferential configuration having its lower region integral with or secured to the lower region of the outer sheeting 31 for distention exteriorly over the lower frame piece regions 26, and extending interiorly of the several inner frame piece legs 24. Further, the inner generally conical sheeting 33 inclines upwardly and inwardly, and terminates spacedly below the several lower frame piece eyes 25, there terminating in the central opening 17 bounded by tunnel or hem 34, through which extends a flexible elongate constrictile element or drawstring 35. Thus, the drawstring 35 may be drawn to releasably constrict the annular hem or collar 34 bounding the central inner wall opening 17.

While the sheeting 20 may be fabricated of any suitable flexible sheet material, porous netting of synthetic yarn has been found entirely satisfactory.

Removably engaged conformably beneath each of the upper and lower fittings 28 and 29 may be a rigidifying insert, 40 and 41, respectively. The inserts 40 and 41 may each be of generally annular configuration but without limitation thereto, including a radially slotted central or plug portion 42 and 43 conformably engageable beneath the respective fitting 28 and 29. That is, the plug portions 42 and 43 are radially slotted, as at 44 and 45 for receiving respective frame piece eyes 23 and 25.

In addition, the rigidifying inserts 40 and 41 each includes a circumferential, radially outstanding lower flange 46 and 47 which respectively underlie the adjacent upper polygonal fitting 28 and 29 when the plug is engaged upwardly through the fitting. That is, the radially outstanding, circumferential flanges 46 and 47 underlie fittings 28 and 29 and adjacent portions of eyes 23 and 25. In particular it will be seen that the flanges 46 and 47 are each provided on its upper side with a plurality of radially extending, upwardly facing recesses or grooves 48 and 49, each conformably receiving the lower portion of a respective eye 23 and 25.

In addition, an upper rigidifying cover or retaining cap, as at 50 and 51, respectively, is engaged over each insert 40 and 41, respectively and its associated eyes 23 and 25. The retaining caps or covers 50 and 51 are respectively provided with downwardly facing, radially extending, upwardly and radially inwardly inclined grooves 52 and 53 each receiving a respective eye 23 and 25, and urging the received eyes radially inwardly. The retainer caps or covers 50 and 51 are provided with circumferential depending skirts, as at 54 and 55, the grooves 52 and 53 extending radially outwardly through the respective skirts to define passageways for the frame pieces 19.

The lower and upper rigidifying inserts 40 and 41 are each internally threaded, as at 56 and 57, and there is associated with each insert an externally threaded nipple or tube 58 and 59 engaged downwardly through the respective retainer cover or cap 50, 51 annular fitting 28, 29, and threadedly into the lower rigidifying insert 40, 41. The tubular nipples 58 and 59 may each include an upper enlargement or head, as at 60, 61, which may be slotted or polygonal, as for easy turning by a screwdriver or wrench. Thus, the upper and lower nipples or tubes 58 and 59 may be threaded downwardly into their respective receiving rigidifying member 40, 41, so that the enlargement or head 60, 61 engages the upper side of the respective cover cap 50, 51. In this manner, the cover caps 50 and 51 cooperate with their respective rigidifying members 40 and 41 to clamp therebetween the frame member end eyes 23 and 25, and, by the inward inclination of the receiving grooves 52 and 53, urge the eyes radially inwardly into engagement with the adjacent tube or nipple 58, 59. The hereinbefore described relatively staunch erected framework may, of course, be quickly and easily collapsed by mere disassembly of the lower and upper hubs and swinging of the frame pieces into adjacent side-by-side relation.

Interposed in the central opening 17 within the collar or hem 34 is a bait support means, generally designated 70. The bait support means 70 may include an annular or tubular member 71 disposed concentrically with the central opening 17. The member 71 engages the annular inner extremity or circular hem 34, which is constricted by the drawstring 35 into firmly secured circumposition about the annular member 71.

Carried by the annular member 71 is an open-ended guide passageway 73 of upwardly convergent, tapering or frusto-conical configuration defining an effective upwardly, one-way path therethrough for insects being trapped, as will appear presently in greater detail.

The bait support means 70 further includes a bait carrier 75, say in the form of a loop, suitably fabricated of wire or other satisfactory material, including a lower bait support region generally centrally of the annular member 71, directly beneath the open-ended guide passage member 73, and an upper suspension portion 76 extending in spaced relation over the open upper end of the guide passage member.

Thus, the bait support means 70 has secured thereto the inner sheeting 33, and with the bait support means located in the central opening 17, the lower sheeting 33 is distended by the frame pieces 22.

The suspension means 9 may include a lower elongate suspension element 80 having its lower end provided with a hook 81 secured to the upper bait carrier region 76, and extending upwardly therefrom through the central opening of the insert 40 and nipple 58, where it may be secured to a ring or connector 82.

The upper annular hem or collar 32 of the flexible sheet cover 20 may rest on the upper side of tube head 60, and a generally circular closure disc or washer 83 may be snugly engaged about the stem or suspension element 80, being relatively freely movable therealong. That is, the washer 83 is provided with a central slot adapted to slidably pass the suspension element or stem 80. Resting on the upper side of the washer 83 is a locking member or plate 84 having a somewhat keyhole shaped central opening 85. The lock plate opening 85 receives therethrough the suspension element or stem 80, and is configured in the manner of a slot having a generally circular, enlarged medial region. Thus, by the opening 85, the lock plate 84 is rotatable, say 90° from the position of FIG. 5, for free movement along the suspension element 80, while interfitting with the notches of the suspension element in the position of FIG. 5 to lock against movement. In the locked position, it will be appreciated that the stem or suspension element 80 is being drawn upwardly to tautly distend the cover 20, and simultaneously to sandwich the upper hem or collar 32 of the cover between the head 60 and washer 83. In order to initiate disassembly, the lock plate 84 may be rotated one-quarter turn to release the stem 80 for downward movement, which will permit removal of portion 76 from stem hook 81. The cover 20 may then be removed from the frame, and the latter collapsed as described hereinbefore.

In this manner, the trap 10 may be supported in protective relation over an animal feeding bowl, or the like, while being freely swingable, as by the animal himself, out of bowl covering relation for feeding.

With an article of bait, as at 63, depending from the lower bait support region 75, any insects in the area will be attracted toward the bait. Experience has shown that the insects fly or crawl upwardly, passing through the guide passage 73 into the internal hollow or space 13, from which their escape is effectively prevented. The trapped insects may be killed by hot water or dehydration. Removal of trapped flies or other insects may be quickly achieved by simple disassembly and emptying. It will now be appreciated that the instant trap may serve to effectively protect an animal feeding dish from flies or other insects, without the need for swatting or other energetic activity, and without resorting to dangerous poisons, sprays and the like. Simple and sanitary emptying may be achieved by merely releasing the bait holding means 70 from its position within the opening 17. The annular hem 34 may then hang downwardly, and in the absence of the bait holding means 70 the contents of the space 13 may fall centrally through the hem 34.

For space saving storage, the above described disassembly may be effected and the several frame pieces 19 may then be swung or rotated generally about the axes of annular fittings 28 and 29, as shown by arrows in FIG. 7, into a collapsed, congruent facing engagement with each other.

While a single mode of use has been described hereinbefore in detail, it is appreciated that the instant device may be employed by resting on the same surface supporting a food dish, rather than suspension from above, and may be otherwise employed, say as a lamp shade, bird cage, decoration, or the like.

From the foregoing, it is seen that the present invention provides a collapsible structure which is admirably well suited for its many intended uses, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A protective insect trap for location over a pet feeding bowl, said trap comprising a downwardly divergent circumferential outer wall for enclosing the space over a feeding bowl, an inner wall extending about the lower region of said outer wall upwardly and inwardly therefrom and terminating at a central opening, said inner and outer walls combining to substantially enclose the space therebetween, bait support means mounted in said central opening for enticing insects upwardly through said opening into said space, and flexible suspension means extending upwardly from said outer wall and connectible to a superior support, to suspend said device for swinging movement away from the feeding bowl, said outer wall including a downwardly divergent flexible outer sheeting, and said inner wall including a flexible inner sheeting extending about the lower region of said outer sheeting upwardly and inwardly therefrom, said inner and outer walls further comprising a framework supporting said inner and outer sheeting, said bait support means comprising an annular member engageable in and extending across said central opening, and an open-ended guide passage member communicating through said annular member and tapering upwardly for passing insects substantially irreversibly in one direction into said enclosed space, said bait support means further comprising a bait carrier beneath said guide passage member.

2. A protective insect trap for location over a pet feeding bowl, said trap comprising a downwardly divergent circumferential outer wall for enclosing the space over a feeding bowl, an inner wall extending about the lower region of said outer wall upwardly and inwardly therefrom and terminating at a central opening, said inner and outer walls combining to substantially enclose the space therebetween, bait support means mounted in said central opening for enticing insects upwardly through said opening into said space, and flexible suspension means extending upwardly from said outer wall and connectible to a superior support, to suspend said device for swinging movement away from the feeding bowl, said outer and inner walls comprising a plurality of generally similar elongate frame pieces each configured to define an open loop and arranged with one end above the other, and upper fitting connecting together the upper ends of all of said frame pieces, a lower fitting connecting together the lower ends of all of said frame pieces, said frame pieces being extendable radially outwardly from said upper and lower fittings, and flexible sheeting covering said radially disposed frame pieces.

3. A protective insect trap according to claim 2, said frame pieces being connected together by said fittings for swinging movement of said frame pieces from said radial disposition to a collapsed position in facing engagement with each other.

4. A protective insect trap according to claim 3, in combination with annular rigidifying members removably interengageable with said upper and lower fittings for retaining said frame pieces in set-up condition.

* * * * *